United States Patent [19]

Kubo et al.

[11] 4,356,740
[45] Nov. 2, 1982

[54] TILTABLE PEDAL APPARATUS

[75] Inventors: Kenji Kubo, Yokohama; Makoto Moriya, Tokyo, both of Japan

[73] Assignee: Nissan Motor Company, Limited, Yokohama, Japan

[21] Appl. No.: 125,896

[22] Filed: Feb. 29, 1980

[30] Foreign Application Priority Data

Mar. 8, 1979 [JP] Japan .......................... 54/29474[U]

[51] Int. Cl.³ .............................................. G05G 1/14
[52] U.S. Cl. ..................................................... 74/560
[58] Field of Search .................................. 74/560, 513

[56] References Cited

U.S. PATENT DOCUMENTS 1,776,497 9/1930 Feick ..................................... 74/513
3,715,934 2/1973 Reed ..................................... 74/560

FOREIGN PATENT DOCUMENTS 2237623 2/1974 Fed. Rep. of Germany ........ 74/560

Primary Examiner—Kenneth Dorner
Attorney, Agent, or Firm—Schwartz, Jeffery, Schwaab, Mack, Blumenthal & Koch

[57] ABSTRACT

A tiltable pedal is assembled with a pin which is laterally welded to an accelerator lever. The pedal has two lugs formed with mutually aligned through holes. At least one of the lugs is further formed with a V-shaped slit which is contiguous with the through hole. The pin is laterally pressed through the slit into the through hole to allow tilting of the pedal about the pin. An end portion of the tilt spring is extended across the V-shaped slit to prevent the pin from moving laterally out of the through hole and through the V-shaped slit.

4 Claims, 6 Drawing Figures

TILTABLE PEDAL APPARATUS

BACKGROUND OF THE INVENTION

The present invention relates to a foot-operated pedal which is tiltably attached to a lever, e.g., an accelerator lever of a vehicle.

With the tiltable pedal applied to a vehicle accelerator pedal, when it is desired to accelerate the vehicle, the pedal is depressed by the driver's foot and tilted relative to the accelerator lever which is rocked corresponding to the depression of the tiltable pedal. Thus, the front surface of the pedal may be kept at a desired angle, so that the driver need not tilt his toe corresponding the rocking motion of the accelerator pedal. Consequently, operation of the vehicle can be facilitated, serving to reduce the driver's effort.

One example of the conventional tiltable pedal is shown in FIG. 6. A pedal a has a pair of lugs b which are formed with mutually aligned circular through holes c and V-shaped slits d contiguous with the respective through holes c. An accelerator lever, not shown, is provided with a lateral pin e which is pressed into the through holes c laterally through the V-shaped slits d. Thus, the pedal a is tiltable about the pin e. A tilt spring, not shown, formed as a twist coil spring, is wound about the pin e, and both ends of the tilt spring engage with the accelerator lever and the pedal a, respectively, to urge the pedal a to a predetermined normal position.

Such a conventional tiltable pedal can be very easily mounted onto the accelerator lever. However, during an erroneous operation, e.g. when the driver's toe contacts the rear surface of the pedal and is then lifted upwardly, the pedal may be disengaged from the pin and the operation of the accelerator pedal becomes impossible.

To solve the problem, the V-shaped slits d may be eliminated. By this, however, assembly of the pin e and the pedal a becomes very troublesome, and the tilt spring cannot readily be engaged with the pin. Therefore, this solution is not practical. Thus, it is rather desirable to form the V-shaped slit in at least one of the lugs to allow lateral press-in fitting between the lug and the pin, even though the problem relating to disengagement of the pedal from the pin cannot be completely solved.

SUMMARY OF THE INVENTION

Accordingly, an object of the present invention is to provide an improved tiltable pedal apparatus capable of mitigating the above-mentioned disadvantage and provided with means to prevent the pedal from being removed laterally from the pin.

According to the present invention, there is provided a tiltable pedal apparatus including a pedal provided with lugs which are formed with through holes, respectively. at least one lug is formed with a slit which is contiguous with the through hole. A lever is provided having a lateral pin which is laterally fitted into the through hole through the slit such that the pedal is tiltable about the pin. A tilt spring in the form of a twist coil spring wound about the pin engages with the lever and the pedal to urge the pedal in one direction. A portion of the tilt spring is extended across the slit to prevent the pedal from being removed laterally from the pin.

Thus, while the assembly of the pedal and the pin is not impaired, the extended portion of the tilt spring effectively retains the pin in the through opening of the lug.

Preferably, the lug has a stepped portion to retain the extended portion of the tilt spring from displacing remote from the pin.

Preferably, the lug has a small hole to receive a free end of the extended portion of the tilt spring to prevent the tilt spring from displacing remote from the pin.

By disposing the stepped portion and the small hole on opposite sides of the slit, rigidity of the extended portion of the tilt spring against bending is remarkably improved so that the spring effectively retains the pin in the through hole.

The present invention will now be explained in detail by referring to one specific embodiment shown in the drawings.

DETAILED DESCRIPTION OF AN EMBODIMENT

Figure 1:
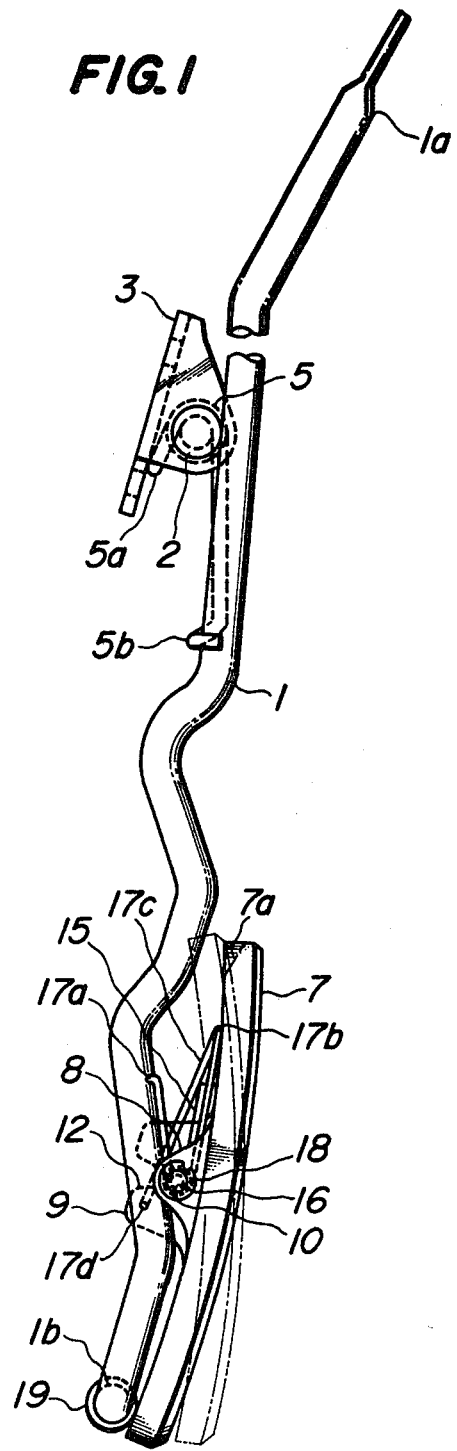
FIG. 1 is a left side elevation of a tiltable pedal apparatus according to the present invention.
Figure 2:
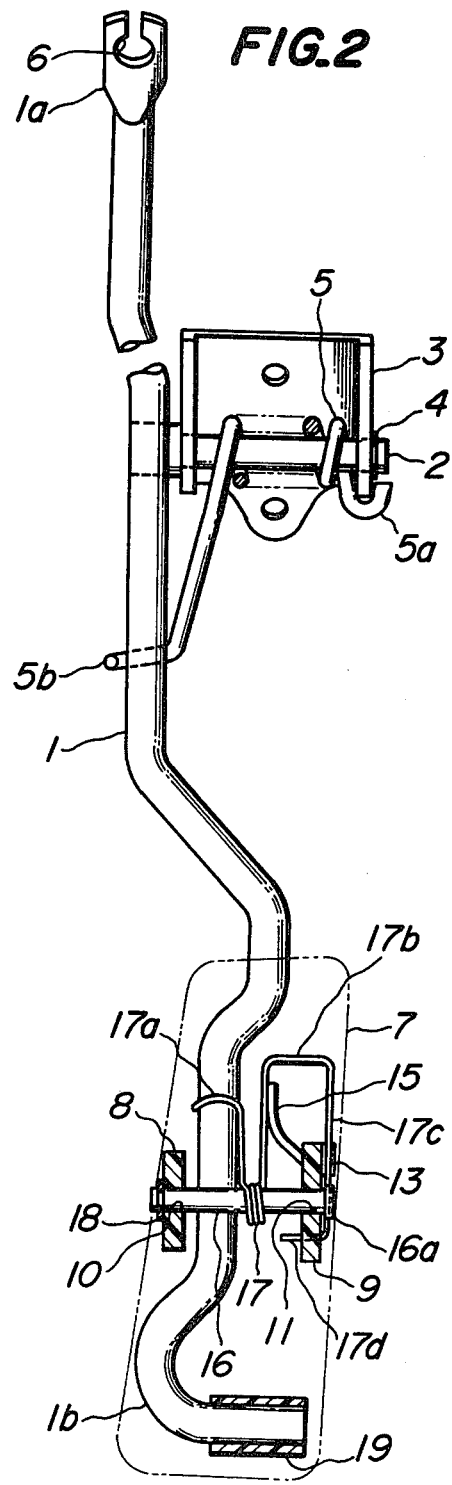
FIG. 2 is a front elevation of the apparatus shown in FIG. 1.
Figure 3:
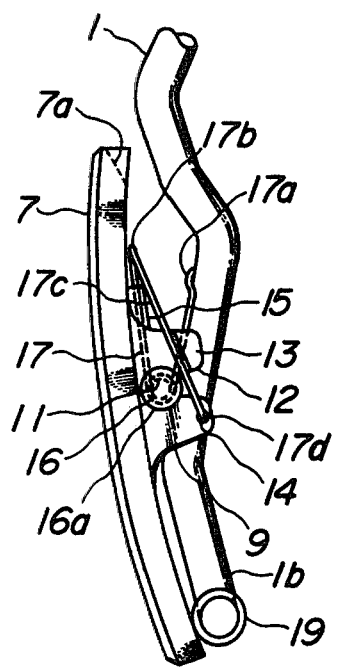
FIG. 3 is a right side elevation of the apparatus shown in FIG. 1.

Referring now to FIGS. 1 to 3, reference numeral 1 designates an accelerator lever which has a laterally projected pivot shaft 2 welded to the lever 1 at generally intermediate portion thereof. The pivot shaft 2 passes through a bracket 3 fixed to a vehicle body, and the projected end of the shaft 2 is retained by a snap ring 4 (FIG. 2). Thus, the accelerator lever 1 is supported by the vehicle body pivotably about the pivot shaft 2. A return spring 5, which is a twist coil spring, is wound about the pivot shaft 2. One end 5a of the return spring 5 is engaged with the bracket 3, and the other end 5b is engaged with the accelerator lever 1, to urge the accelerator lever 1 counterclockwise as seen in FIG. 1 and to normally retain the lever 1 at a predetermined position, i.e., idling position.

Figure 4:
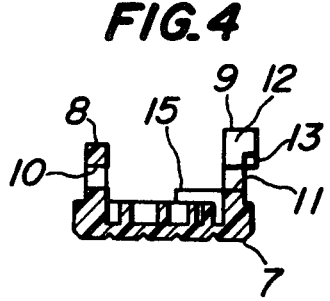
FIG. 4 is a cross-sectional view of the pedal shown in FIG. 1 and taken along line A—A of FIG. 5.
Figure 5:
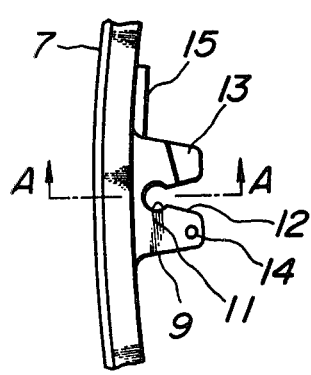
FIG. 5 is a side view of a portion of the pedal shown in FIG. 1.
Figure 6:
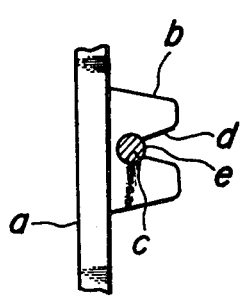
FIG. 6 is a side view of a portion of a conventional tiltable pedal.

One end 1a of the accelerator lever 1 is formed with a connection opening 6 for an acceleration cable, not shown, and the other end 1b is connected with an accelerator pedal 7. To this end, the rear surface of the accelerator pedal 7 has on its both sides lugs 8 and 9 shown in FIGS. 4 and 5, which are formed integrally with the pedal 7 by suitable material, e.g., thermoplastic synthetic resin. The lugs 8 and 9 are formed with mutually aligned circular through holes 10 and 11, respectively. The lug 9 is further formed with a V-shaped slit 12 extending from the free end of the lug 9 and having a width which decreases toward the through hole 11 so that the lug 9 consists essentially of two legs, as shown in FIG. 5. One of the legs is provided on its free end with an outwardly projected stepped portion 13 (FIG. 4) and the other leg is formed with a small hole 14 generally at the free end thereof. The width of the V-shaped slit 12 is determined such that the width at the bottom end which is communicated with the through hole 11 is smaller then the diameter of the through hole 11, and the width at the open end is larger than the diameter of the through hole 11. As shown in FIGS. 2 and 4, a rib 15 extends on the rear surface of the pedal 7 from the inner surface of the lug 9 diagonally toward the lateral center portion of the pedal 7.

As shown in FIGS. 1 to 3, a pin 16 is welded to the other end portion 1b of the accelerator lever 1 to laterally project from the both sides of the lever 1. The pin 16 is parallel with the pivot shaft 2, and has an enlarged head 16a at one end. The diameter of the pin 16 is generally equal with that of the through holes 10 and 11. A tilt spring 17 which is a twist coil spring is fitted onto the pin 16 from the side of the enlarged head 16a. The pedal 7 is positioned such that the left end of the pin 16 as seen in FIG. 2 is free from the lug 8 and a portion of the pin 16 is in the V-shaped slit 12 of the lug 9. This position is the leftwardly displaced position of the pedal 7 relative to the lever 1, as seen in the assembled position shown in FIG. 2. Then, the pedal 7 is forced toward the pin 16 until the pin 16 passes through the bottom end of the V-shaped slit 12 into the through hole 11. The other end of the pin 16 is thus aligned with the through hole 10 of the lug 8. Then, the pedal 7 is moved rightwardly from the above-mentioned displaced position to the assembled position shown in FIG. 2, to pass the left end portion of the pin 16 through the opening 10. A snap ring 18 is engaged with the projected left end of the pin 16 to retain the pin 16 in the assembled position by means of the snap ring 18 and the enlarged head 16a. Thus, the pedal 7 is supported by the lever 1 pivotably about the pin 16.

When the pedal 7 and the accelerator lever 1 are assembled as shown in FIGS. 1 to 3, one end 17a of the tilt spring 17 is engaged with the accelerator lever 1, and the other end 17b is engaged with the rear surface of the pedal 7 to urge the pedal 7 clockwise a viewed in FIG. 1 (counterclockwise as viewed in FIG. 3). The rotation of the pedal 7 is limited by a plastic sleeve 19 fitted on bent end of the end portion 1b of the lever 1. The sleeve 19 contacts with the rear surface of the pedal 17 and normally retains the pedal 7 as shown by solid line in FIG. 1. When the accelerator pedal 7 is depressed, the pedal 7 can be tilted between the normal retained position and a tilted position shown by imaginary line in FIG. 1, in which a recess 7a of the pedal 7 contacts with the accelerator lever 1. Thus, the front surface of the pedal 7 always contacts the entire sole surface of a driver's foot without tilting his toe corresponding to depression of the pedal 7. Consequently, a comfortable driving position is ensured, and the driver's effort can be greatly saved.

According to the present invention, as shown by extended portion 17c in FIGS. 2 and 3, the other end portion 17b of the tilt spring 17 is extended along the outer side surface of the lug 9 and under the stepped portion 13. The terminal end 17d of the extended portion 17c is bent and passed into the small hole 14 formed in one of the legs of the lug 9. Thus, the extended portion 17c of the tilt spring 17 extends across the V-shaped slit 12, and is retained by the lug 9. Consequently, the extended portion 17c closes the opening of the V-shaped slit to prevent removal of the pedal 7 from the pin 16 in the following manner.

When a force is applied to the pedal 7 to remove the pedal 7 from the pin 16, the pin 16 which is fitted in the through hole 11 of the lug 9 tends to move into the V-shaped slit 12 laterally from the through hole 11. As the V-shaped slit 12 is closed by the extended portion 17c of the tilt spring 17, the enlarged head 16a of the pin 16 contacts the extended portion 17c of the tilt spring 17 so that the pin 16 is prevented from moving out of the through hole 11. Even when substantial force is applied to the tilt spring 17, the deflection of the extended portion 17c of the spring 17 can be minimized by engagement of the extended portion 17c with the stepped portion 13 at one side and by engagement of the terminal end 17d with the small hole 14 at the other side. Thus, the pin 16 cannot be moved into the V-shaped slit 12, and the pin 16 is positively retained in the through hole 11.

As shown in FIG. 2, the tilt spring 17 between the pin 16 and the end portion 17b is received by the rib 15. The rib 15 and the accelerator lever 1 determine the position of the wound portion of the spring 17 relative to the pin 16. Then, the extended portion 17c of the tilt spring 17 passes about the end of the rib 15, under the stepped portion 13 on the outside surface of the lug 9, on the enlarged head 16a of the pin 16, and into a small hole 14 of the lug 9. Thus, at the time of fitting the tilt spring 17 onto the pin 16 by insertion from the side of the enlarged head 16a, as stated previously, the lateral position of the tilt spring 17 is determined positively, so that the tilt spring 17 is prevented from lateral displacement and undesired twisting even when the diameter of the wound portion of the tilt spring is much larger than that of the pin 16 and the tilt spring is not held in position by the pin 16 only.

It will be appreciated that the tiltable pedal apparatus, according to the present invention, has means to close the opening of the V-shaped slit 17 in the form of the extended portion 17c of the tilt spring 17. Thus, disengagement of the accelerator pedal 7 from the accelerator lever 1 can be positively prevented whatever external force is applied to the pedal 7, and the accelerator pedal never becomes inoperable.

In the illustrated embodiment, the V-shaped slit 12 is formed in the side lug 9 only. However, the lug 8 also may be formed with a V-shaped slit, which is closed by another corresponding spring means to keep the pedal from removable. In this case, assembly of the lever and the pedal is further facilitated.

What is claimed is:
1. A tiltable pedal apparatus including:
a pedal provided with lugs which are formed with through holes, respectively, at least one lug being formed with a slit which is contiguous with its said through hole;
a lever having a lateral pin which is laterally fitted into said through hole in said at least one lug through said slit such that said pedal is tiltable about said pin;
a tilt spring in the form of a twist coil spring wound about said pin and engaging with said lever and said pedal to urge said pedal in one direction, wherein a portion of said tilt spring extends across said slit and along a side surface of said at least one lug formed with the slit; and means provided on said side surface of said at least one lug for engaging said extended portion of said spring to prevent said pedal from being removed laterally from said pin, said means comprising a stepped portion projecting laterally from said at least one lug to retain said extended portion of said tilt spring from being displaced from said pin.

2. An apparatus as claimed in claim 1, wherein said means further comprises a small hole formed in said at least one lug to receive a free end of said extended portion of said tilt spring to prevent said tilt spring from being displaced from said pin.

3. An apparatus as claimed in claim 2, wherein, said stepped portion and said small hole are formed on said at least one lug on opposite sides of said slit for preventing said tilt spring from being displaced from said pin.

4. An apparatus as claimed in claim 1, wherein said portion of said tilt spring extends from said pin against said pedal, and from said pedal across said slit of said at least one lug, and in contact with said stepped portion.

* * * * *